April 7, 1970     L. STOCKS     3,504,898
VACUUM PURIFICATION OF METALS
Filed Aug. 17, 1967     2 Sheets-Sheet 1
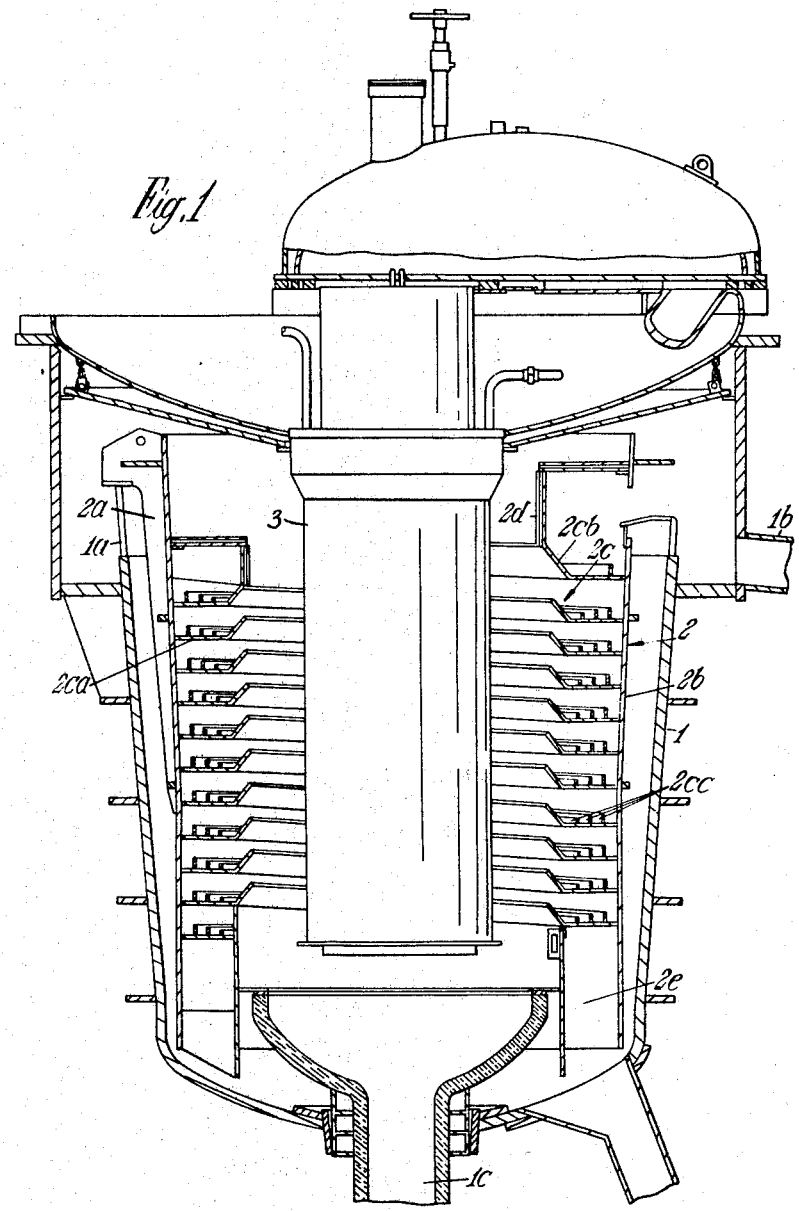

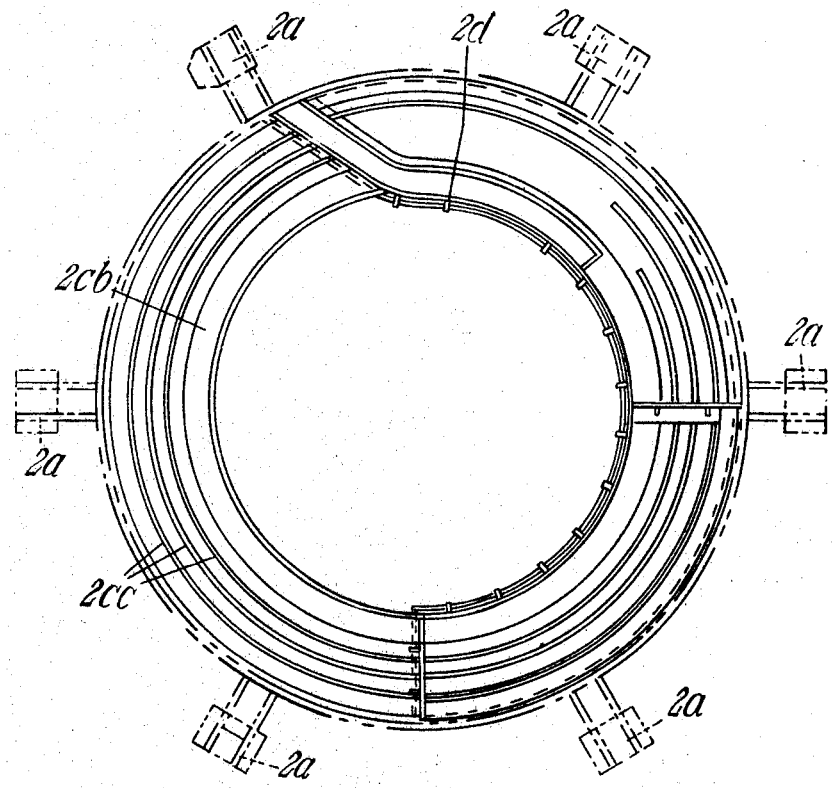

United States Patent Office 3,504,898
Patented Apr. 7, 1970

1

3,504,898
VACUUM PURIFICATION OF METALS
Leon Stocks, Avonmouth, England, assignor to Broken Hill Associated Smelters Proprietary Limited, Melbourne, Victoria, Australia, a company of Australia
Filed Aug. 17, 1967, Ser. No. 661,396
Claims priority, application Great Britain, Aug. 30, 1966, 38,669/66
Int. Cl. C22b *19/16*
U.S. Cl. 266—34                              6 Claims

ABSTRACT OF THE DISCLOSURE

A vacuum vessel is used for the purification of metals. Within the vessel there is a free standing spiral launder down which the metal circulates.

---

This invention relates to the vacuum purification of metals and is more especially but not solely concerned with apparatus for controlling the flow of liquid lead containing zinc through a vacuum vessel during which flow the zinc is to be evaporated off from the lead for separate condensation.

Generally, this has been done in a vacuum vessel of frusto-conical shape arrangement with its axis vertical and the lead has been arranged to flow over the inside wall of the vessel.

Difficulty is experienced in keeping the lead flow adhering to the wall of the vessel and also any corrosion occurring damages the vessel itself which is expensive to replace. This latter difficulty also arises if means for channelling the flow of metal are secured to the inner wall of the vessel.

The present invention consists in a vacuum vessel for the purification of liquid metals which includes a removable spiral channel unit for conducting the liquid metal through the vessel.

Conveniently, the spiral channel unit is in the form of a single start spiral secured to a frusto-conical or cylindrical backing plate which is equipped with support brackets by means of which it rests and is located in a desired position in the vacuum vessel.

This unit is relatively cheap to renew and may be readily removed for cleaning or replacement by another unit.

The invention will be further described with reference to the accompanying drawings.

FIGURE 1 is a cross-section of a vacuum vessel containing a removable spiral channel; and FIGURE 2 is a plan view of the removable spiral channel.

The vacuum vessel 1 which is of rigid construction to sustain the forces involved is formed with a ledge 1*a*. Into this there fits the removable spiral channel member 2 which rests on ledge 1*a* by means of six circumferentially spaced gussets 2*a*. The gussets are secured to the outside of a tapered cylindrical shell 2*b* forming the outer side wall of the spiral and to the inside of which is secured the single start spiral 2*c* consisting of a horizontal (in section) base part 2*ca* and an inner inclined part 2*cb*. On the horizontal base part are arranged three spaced vertical spiral walls 2*cc*, the outer one of which is taller than the middle one and the middle one taller than the inner one.

2

A feed-in channel to the spiral channel 2 is shown at 2*d* and a feed-out channel at 2*e*.

In operation the liquid lead metal is circulated to the feed-in channel 2*d* from an outside pipe 1*b* and circulates around the spiral guided by the vertical spiral walls 2*cc* and is removed via the feed-out channel 2*e*. The lead flow is thus maintained in the spiral out of contact with the inner walls of the vessel 1.

Zinc vapours evaporating from the lead are guided radially inwardly by the form of the spiral and are condensed on a cooled axial core 3 as in the prior art. Drippings from the core 3 fall through the pipe 1*c* and are thus removed from the vessel.

The form of the spiral shown and its supporting shell is not limitative and other spiral trough shapes would be possible.

Various other modifications may be made within the scope of the invention. Thus the vacuum vessel may be of cylindrical shape with dished ends since there is no longer the requirement to flow the liquid lead down its side walls.

Also anticorrosion plates may be secured to the inside walls of the vacuum vessel.

I claim:

1. A device for the purification of liquid metals comprising a vacuum vessel including an upper peripheral ledge portion, a spiral channel unit including support means resting on said peripheral ledge portion of said vessel, said support means alone supporting said spiral channel unit within said vessel and said spiral channel unit being otherwise unconnected to said vessel, whereby said spiral channel unit can be removed from said vessel for maintenance or substitution and replaced in situ by merely lifting said support means from said peripheral ledge portion of said vessel.

2. A device as claimed in claim 1 further including a cooled axial core disposed in spaced relationship within said spiral channel unit.

3. A device as claimed in claim 1 wherein said spiral channel unit includes a single start spiral secured to a backing plate which defines a continuous constraining wall for said spiral channel unit.

4. A device according to claim 3 wherein said backing plate is frusto-conical.

5. A device according to claim 3 wherein said backing plate is cylindrical.

6. A device according to claim 3 wherein said support means includes a plurality of support brackets secured to said backing plate at circumferentially spaced locations.

References Cited

UNITED STATES PATENTS

| 1,976,617 | 9/1932 | Corson | 75—78 |
| 2,458,253 | 1/1949 | Chisholm et al. | 266—19 |
| 3,031,296 | 4/1962 | Davey | 75—88 |

FOREIGN PATENTS

| 685,484 | 1/1953 | Great Britain. |

J. SPENCER OVERHOLSER, Primary Examiner

J. S. BROWN, Assistant Examiner

U.S. Cl. X.R.

75—14; 209—459